No. 761,688. PATENTED JUNE 7, 1904.
D. H. LOVELESS.
SHAFT SUPPORT FOR VEHICLES.
APPLICATION FILED JAN. 28, 1904.
NO MODEL.
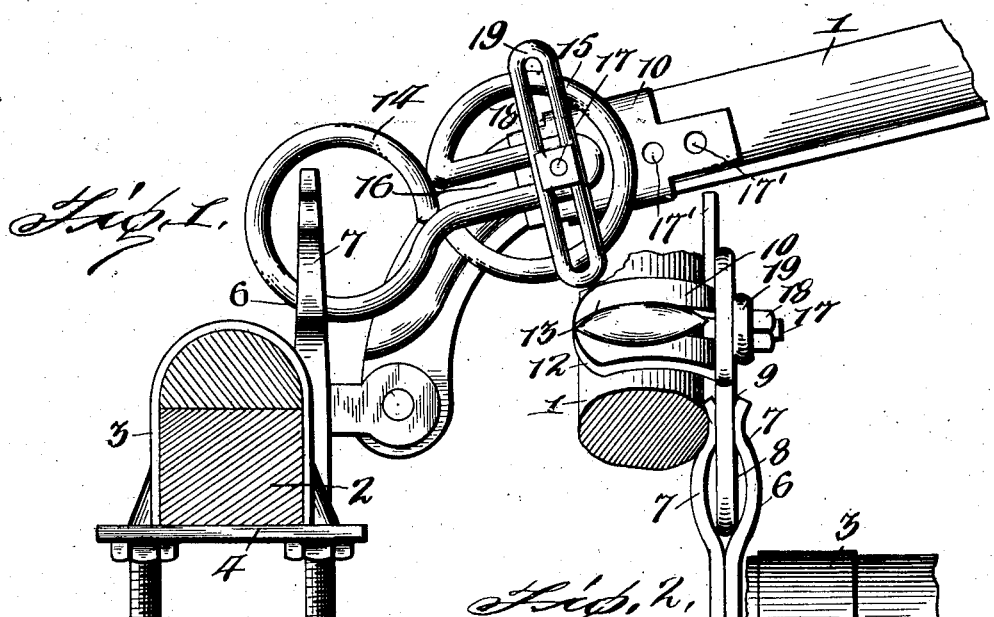
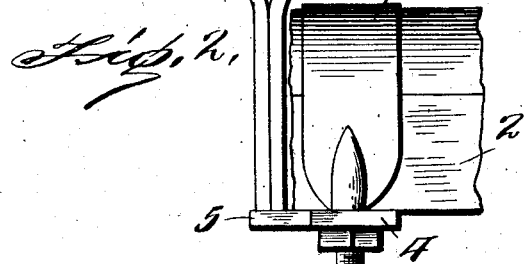
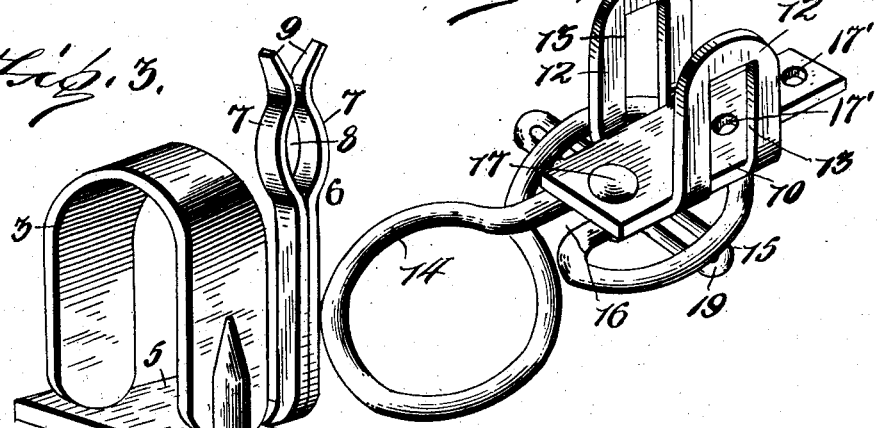
Inventor
D. H. Loveless.
Witnesses
By
Attorney No. 761,688.

Patented June 7, 1904.

UNITED STATES PATENT OFFICE.

DAVID H. LOVELESS, OF PROVO, UTAH, ASSIGNOR OF ONE-HALF TO J. J. KNIGHT AND A. A. LOVELESS, OF PROVO, UTAH.

SHAFT-SUPPORT FOR VEHICLES.

SPECIFICATION forming part of Letters Patent No. 761,688, dated June 7, 1904.

Application filed January 28, 1904. Serial No. 191,006. (No model.)

*To all whom it may concern:*

Be it known that I, DAVID H. LOVELESS, a citizen of the United States, residing at Provo, in the county of Utah and State of Utah, have invented certain new and useful Improvements in Shaft-Supports for Vehicles; and I do declare the following to be a full, clear, and exact description of the invention, such as will enable others skilled in the art to which it appertains to make and use the same.

This invention relates to improvements in shaft or thill supports for vehicles.

The object of the invention is to provide a device of this character which may be applied to vehicles with the members of the support so disposed that when the shafts or tongue of the vehicle is raised said members will become engaged and will hold said shafts or tongue in its raised position.

A further object is to provide a device of this character which will be simple in construction, strong and durable, readily applied, and well adapted to the use for which it is designed.

With these and other objects in view the invention consists of certain novel features of construction, combination, and arrangement of parts, as will be more fully described, and particularly pointed out in the appended claims.

In the accompanying drawings, Figure 1 is a side view of the device, showing the application of the same to the axle and shaft of a vehicle. Fig. 2 is a rear view of the same. Fig. 3 is a detail perspective view of the axle member of the device, and Fig. 4 is a similar view of the shaft member.

Referring more particularly to the drawings, 1 denotes the shafts, and 2 denotes the axle, of a vehicle. On the axle is secured a clip 3, to the lower horizontal bar 4 of which is formed a lateral extension 5, to which is secured an upwardly-projecting catch 6, which consists of spring-fingers 7, curved outwardly or bowed near their upper ends to form an eye 8. The upper ends of the fingers 7 are flared outwardly, as shown at 9, to facilitate the engagement therewith of the shaft member of the support. The shaft member consists of an attaching-bracket 10, having laterally-projecting right-angularly-disposed arms or plates 12, which engage the upper and lower sides of the shaft. The plates 12 are provided with alined slots 13, through which pass the usual T-bolts, which secure the thill-coupling iron to the shaft and which also secure the bracket 10 in place, the slots 13 permitting the bracket to be adjusted laterally toward and from the shaft. To the side of the bracket is adjustably secured a catch-engaging element which consists of a ring or loop 14, which when the shafts are raised will be forced between the flaring ends of the spring-fingers 7 and enter the eye 8. The opposite end of the catch-engaging element is bent to form a head 15, in which is formed an elongated opening 16. A bolt 17 is passed through one of a series of adjusting-holes 17' in the side of the bracket 10, and with said bolt is engaged the elongated opening 16, whereby the catch-engaging element may be adjusted lengthwise along the shaft, additional adjustment of the catch-engaging element being afforded by the holes 17', into which the bolt 17 may be shifted.

On the outer end of the bolt 17 is screwed a nut 18, and between the nut and the head 15 is disposed an elongated washer 19, which extends across the head 15, as shown, to brace and firmly hold the same in place.

The axle member of the support is secured to the axle at a position approximately in line with the side of the shafts, which are then raised, and the catch-engaging element is adjusted in position to pass between the spring-fingers of the catch and when in this position is secured by the clamping-washer 19, so that when the shafts are raised the ring or loop 14 of the catch-engaging element will be forced between the flaring ends of the spring-fingers 7 and into the eye 8. The spring-fingers 7 are of sufficient strength to support the weight-shafts in an elevated position, but are sufficiently elastic to permit the ring or loop 14 to be readily withdrawn from the eye 8 to lower the shafts.

While the spring-fingers 7 of the shaft member is here shown as formed on an independent axle-clip, they may, if desired, be formed on or a part of the thill-coupling clip. It will also be obvious that with slight modifications in the attaching means the device will be equally adapted for supporting the pivoted tongues of vehicles.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a shaft-support, the combination with the axle and shafts of a vehicle, of a catch upon the axle, a supporting-bracket attached to and laterally adjustable upon the shafts, and an engaging member adapted to coöperate with said catch and adjustable longitudinally of the shafts on said bracket.

2. In a shaft-support, the combination with the axle and shafts of a vehicle, of a catch carried by the axle, and a coöperating engaging device carried by the shafts, said engaging device comprising a bracket secured to and laterally adjustable upon the shafts, a catch-engaging element having a head provided with a longitudinal slot, a fastening passing through said head and the bracket and connecting the catch-engaging member thereto and so as to be longitudinally adjustable thereon, and a washer bearing against said head and engaging said fastening to hold the parts securely in adjusted position.

3. In a shaft-support, the combination with the axle and shafts of a vehicle, of an axle member comprising a clip, upwardly-projecting spring catch-fingers formed on the cross bar or plate of said clip, a shaft member comprising a bracket having laterally-projecting slotted shaft-engaging members whereby the same is adjustably secured to said shaft, a catch-engaging element having a ring or loop formed on one end and an attaching-head formed on the opposite end, an elongated opening formed in said head to engage a bolt on said bracket, whereby said catch-engaging element is adjustably connected to the bracket, and means whereby said element is clamped in its adjusted positions, substantially as described.

4. In a shaft-support, the combination with the axle and shafts of a vehicle of an axle member, comprising a clip having a spring-catch formed thereon, a shaft member comprising a bracket adjustably secured to said shafts, a catch-engaging element having a ring or loop formed on one end and an attaching-head formed on the opposite end, an elongated opening formed in said head to engage a bolt on said bracket whereby said catch-engaging element is adjustably secured to the bracket, an elongated clamping-washer arranged over said attaching-head, one end of said washer engaging the aforesaid bolt and being secured thereon by a nut, and a bolt and nut arranged in said bracket to engage the opposite end of said elongated washer whereby upon the screwing up of said nut said washer will be clamped against said attaching-head to hold said catch-engaging element in adjusted positions, substantially as described.

In testimony whereof I have hereunto set my hand in presence of two subscribing witnesses.

DAVID H. LOVELESS.

Witnesses:
  W. C. STONE,
  VICTOR DALLIN.